United States Patent Office 3,420,849
Patented Jan. 7, 1969

3,420,849
BENZOOXATHIAZEPINES AND PROCESS
THEREFOR
Fernand G. F. Eloy, Rhode Saint Genese, and André Van Overstraeten, Waterloo, Belgium, assignors to Union Carbide Corporation, a corporation of New York
No Drawing. Filed Mar. 15, 1966, Ser. No. 534,407
U.S. Cl. 260—327       5 Claims
Int. Cl. C07d 95/00

ABSTRACT OF THE DISCLOSURE

Benzooxathiazepines of the formula:

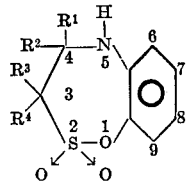

wherein $R^1$ is a monovalent hydrocarbon group of up to 18 carbon atoms bonded to the position 4 carbon atom through a carbon atom of $R^1$ which is part of a benzenoid system either (a) directly or (b) indirectly through a carbonyl group, wherein $R^2$ and $R^4$ are hydrogen or hydrocarbon groups of up to 18 carbon atoms, and wherein $R^3$ is hydrogen, halogen or a hydrocarbon group of up to 18 carbon atoms. The benzooxathiazepines are produced by condensing a sulfene with an aromatic nitrone. The benzooxathiazepines are useful in the preparation of surfactants and chelating agents.

---

This invention relates to heterocyclic organic compounds. More particularly, the invention is directed to a class of benzooxathiazepines and derivatives thereof, and to methods for producing such benzooxathiazepines and derivatives. This class of compounds has not been known or described heretofore.

The compounds of this invention are those represented by the formula (A)

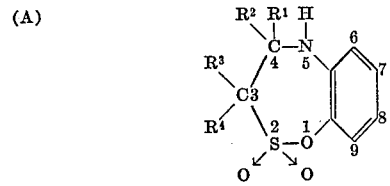

wherein $R^1$ is a monovalent organic group bonded to the ring carbon atom through (a) a carbon atom of $R^1$ which is part of a benzenoid ring system or (b) a carbon atom of $R^1$ which is part of a benzenoid ring system plus a carbonyl group; $R^2$ is hydrogen or a monovalent organic group; $R^3$ is hydrogen, halogen or a monovalent organic group; and $R^4$ is hydrogen or a monovalent organic group. Preferably, the $R^1$ groups and the $R^2$, $R^3$ and $R^4$ groups, when the latter three groups represent organic groups, contain from one to about 18 carbon atoms and are monovalent hydrocarbon groups or halogen-substituted monovalent hydrocarbon groups.

The process of this invention comprises contacting one or more nitrones of the formula (B)

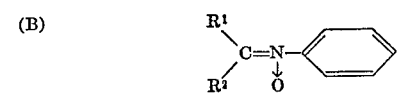

with one or more sulfenes of the formula (C)

until at least one compound of Formula A is produced.

It is believed that the nitrone and sulphene first react to give an (unstable) oxathiazole of the formula (D)

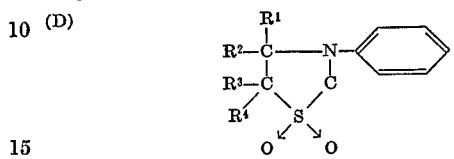

which rapidly rearranges to a compound of Formula A.

In Formulas B, C and D, the groups $R^1$, $R^2$, $R^3$ and $R^4$ have the meanings defined with reference to Formula A.

In the above formulas, $R^2$, $R^3$ and $R^4$ can be hydrogen or alkyl, aryl, aralkyl, alkaryl, alkenyl, alkynyl, cycloalkyl, cycloalkenyl, and the like groups, for example, methyl, tertiarybutyl, hexyl, isooctyl, decyl, octadecyl, phenyl, phenylethyl, terphenyl, cumyl, mesityl, vinyl, allyl, butyn-2-yl, cyclopentyl, cyclohexenyl or cycloheptyl groups, or derivatives of such groups containing one or more halogen atoms, nitro groups or alkoxy groups. Such alkoxy groups preferably contain from one to about 4 carbon atoms, for example methoxy, propoxy and isobutoxy. $R^1$ can be any of the monovalent organic groups described in this paragraph which contain a benzenoid ring system through a carbon atom of which the $R^1$ group can be bonded directly or indirectly (through a carbonyl group) to the position-4 carbon atom of the oxathiazepine ring. $R^3$ can also be a halogen atom.

The term "halogen" as used herein includes the elements fluorine, chlorine, bromine and iodine. The symbols $C_2H_5$, $C_6H_5$ and $C_6H_4$ represent, respectively, the ethyl, phenyl and paraphenylene groups.

This invention also includes derivatives of compounds of Formula A, for example, derivatives obtained by introducing halogen or hydrocarbon substituents at one or more of the 6, 7, 8 and 9 positions on the benzene ring, derivatives obtained by acylation or nitrous acid reactions at the position 5 nitrogen, and introduction of various functional groups onto the $R^1$, $R^2$, $R^3$ and $R^4$ moieties.

The compounds of Formula A wherein $R^2$ is hydrogen can be oxidized (or dehydrohalogenated where $R^2$ is hydrogen and $R^3$ is halogen) to produce compounds of the formula (E)

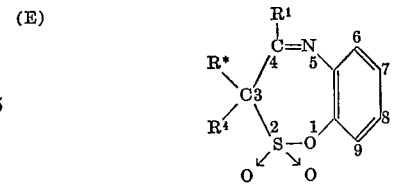

wherein $R^1$ and $R^4$ have the meanings defined with reference to Formula A, and $R^*$ is hydrogen, halogen, or a monovalent organic group. When the compounds of Formula E are prepared by the oxidation process, (no restriction on $R^3$) $R^*$ can be any of the groups represented by $R^3$; when the compounds of Formula E are prepared by the dehydrohalogenation process ($R^3$ must be halogen), $R^*$ is always hydrogen. The carbon-nitrogen double bond in compounds of Formula E can be hydrogenated by conventional techniques to regenerate a compound of Formula A.

In carrying out the process of this invention, the sulfene of Formula C is produced in situ by the reaction of a sulfonylchloride (or other sulfonylhalide) of the formula (F) 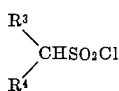

wherein $R^3$ and $R^4$ have the meanings defined hereinabove, with a hydrogen halide acceptor. The hydrogen halide acceptor is preferably a tertiary amine such as diphenylbutyl amine, triisopropyl amine, trimethyl amine, methyl piperidine, triethylamine, pyridine and the like.

The nitrone reactant of Formula B and the sulfene reactant of Formula C are preferably contacted in an inert liquid organic solvent. Suitable solvents include hydrocarbons such as petroleum ether, cyclohexane, 2-ethylhexane, benzene, toluene, xylene and the like, and ethers such as diethyl ether, diisopropyl ether, methylbutyl ether, dioxane, tetrahydrofuran, ethylene glycol dimethyl ether, diethylene glycol dimethyl ether, and the like.

The nitrone and sulfene reactants can be conveniently contacted, for example, by (a) mixing the nitrone and sulfonyl-chloride (preferably in a solvent) and then adding the hydrogen halide acceptor or by (b) mixing the nitrone and hydrogen halide acceptor (preferably in a solvent) and then adding the sulfonylchloride.

The reaction temperature is not narrowly critical, but the process of this invention is preferably carried out at temperatures in the range of about $-5°$ C. to about $100°$ C.

The reaction times vary depending upon the particular reactants, hydrogen halide acceptors, temperature, solvent, and the like. However, recoverable yields of compounds of Formula A are obtained in reaction times on the order of a few minutes to several hours.

The reactant ratios are not narrowly critical. However, it is preferred to contact the nitrone and sulfene (or the sulfonylchloride from which the sulfene is derived) in about a one-to-one ratio. Where a nitrone containing a phenol group is used, a one-to-two mole ratio of nitrone to sulfonylchloride is preferred because of the side reaction of the sulfonylchloride and phenol. The final product then contains a sulfonate group. For example, the reaction of one mole of

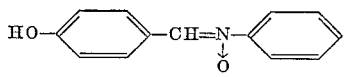

with two moles each of $CH_3SO_2Cl$ and $N(C_2H_5)_3$ gives the product

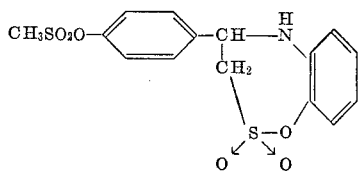

(M.P. 184° C.) in 13 percent yield.

Best yields of compounds of Formula A are obtained when the reaction is carried out under anhydrous conditions and in an atmosphere of inert gas such as argon or nitrogen. There is no advantage to be obtained from the use of elevated or reduced pressures.

The products of Formula A can be recovered from the reaction mixtures by conventional techniques as is illustrated in Example 1 below.

The reactants (compounds of Formulas B, C and F) are known or can be prepared by known methods.

The various derivatives of the compounds of Formula A are obtained by conventional organic chemistry techniques. For example, bromine can be introduced in position 8 of the benzene ring by treating a compound of Formula A with bromine or N-bromo-succinimide.

Where halogens or hydrocarbon groups are desired at one or more of the positions 6, 7, 8 and 9, it is often convenient to use an appropriately substituted nitrone compound of Formula B as the starting material. Thus the nitrones

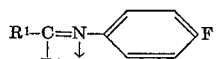

and

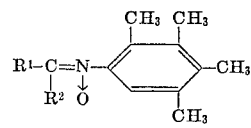

give, respectively, the benzooxathiazepines of the formulas

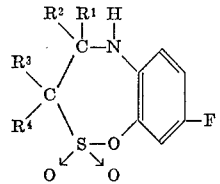

and

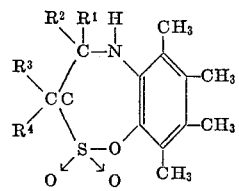

The monovalent hydrocarbon groups thus introduced at the 6, 7, 8 and 9 positions preferably contain from one to about 10 carbon atoms.

A wide variety of organic groups can be substituted for the hydrogen on the 5-position nitrogen atom by the reaction of a compound of Formula A with acylating agents such as carboxylic acid anhydrides, acyl halides, sulfonyl halides and the like. The hydrogen on the 5-position nitrogen atom can also be replaced by an NO group by the reaction of a compound of Formula A with nitrous acid in aqueous solution.

Functional groups can also be introduced on the $R^1$, $R^2$, $R^3$ and $R^4$ groups by conventional organic reactions. For example, where $R^3$ or $R^4$ in a compound of Formula A is a haloalkyl group, reaction with a secondary amine results in replacement of the halogen atom by a secondary amino group. Preferred secondary amino groups are those containing from two to about six carbon atoms, such as dimethyl-amino, diethylamino, ethyl-butylamino, piperidyl, and morpholyl groups.

Compounds of Formula A wherein $R^2$ is hydrogen can be converted to compounds of Formula E by treatment with mild oxidizing agents such as tetrachlorobenzoquinone. Compounds of Formula A wherein $R^2$ is hydrogen and $R^3$ is halogen can be converted to compouds of Formula E by treatment with a hydrogen halide acceptor such as the organic tertiary amines described hereinabove, or other organic amines such as butylamine, diethyl amine and piperidine.

The seven-membered ring in the compounds of this invention is non-planar, and accordingly the compounds of this invention exhibit conformational isomerism.

The compounds of this invention are useful in the preparation of surface active agents (surfactants) and chelating agents. Alkaline hydrolysis of compounds of this invention, for example hydrolysis by means of aqueous sodium hydroxide or alcoholic potassium hydroxide, produces compounds having the formula (G) 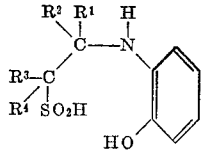

(wherein the $R^1$, $R^2$, $R^3$ and $R^4$ groups and the benzene ring can carry the substituents described hereinabove for compounds of this invention) and/or the alkali metal salts of these compounds. The organic sulfonate group provides the surfactant activity.

Chelate complexes with transition metal cations such as $Fe^{+2}$, $Fe^{+3}$, $Cu^{+2}$, $Co^{+2}$, $Ni^{+2}$ and $Cr^{+3}$, are formed by the reaction of a transition metal salt with at least two of the functional groups $—SO_2H$, $>NH$ and phenolic $—OH$ of the compounds of Formula G. Compounds of Formula G can be used to recover transition metal cations from aqueous solutions by first forming the chelate in solution and then extracting the chelate complex with an organic solvent.

Where the compounds of this invention have an acyl group or NO group attached to the 5-position nitrogen atom, the alkaline hydrolysis described above results in replacement of the such group by a hydrogen atom.

Hydrolysis of compounds of Formula E in acid medium results in the formation of keto-sulfonic acids of the formula (H) 

and ortho-aminophenols of the formula (I) 

wherein the $R^1$, $R^*$ and $R^4$ groups and the benzene ring can have any of the substituents described hereinabove for compounds of this invention.

Many of the compounds of this invention also possess unexpected pharmacological activity. For example, the compounds (products) of Examples 2, 3, 9, 12, 19, 23, 24, 25 and 32 (second product with M.P. 219° C.) are both central nervous system depressants and sedatives, while the compound (product) of Example 26 is both a central nervous system depressant and a hypnotic.

The following examples further illustrate the compounds and processes of this invention. In the examples, all products were identified by both elemental and infrared spectrographic analysis, and many of the products were further examined by nuclear magnetic resonance spectroscopy.

EXAMPLE 1

In a 250 ml. round bottomed flask equipped with a mechanical stirrer, a dropping funnel and a calcium chloride tube, was placed a solution of 5.8 g. (0.025 mole) of alpha-p-chlorophenyl-N-phenylnitrone and 3.25 g. (0.025 mole) of ethane sulfonylchloride, $C_2H_5SO_2Cl$, in 100 ml. of dry benzene. The reaction flask was cooled by means of an ice bath. When the temperature of the solution had dropped to 5° C., a solution of 2.52 g. (0.025 mole) of triethylamine in 5 ml. of dry benzene was added dropwise with stirring. After the addition was complete, the reaction mixture was stirred for an additional two hour period. A precipitate was formed which consisted of triethylamine hydrochloride and insoluble polysulfene. After filtration, the benzene was removed under reduced pressure and the residue was dissolved in hot methanol. (A hot mixture of benzene and hexane can also be used). By cooling the solution, 3 g. (37% yield) of a compound of this invention having the formula

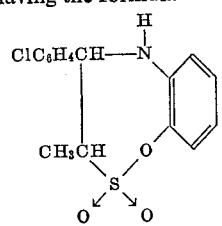

were obtained as white crystals melting at 188° C.

Analysis.—$C_{15}H_{14}ClNO_3S$. Theory: C, 62.50; H, 4.87; N, 4.87. Found: C, 62.17; H, 5.19; N, 4.88.

The identical product was obtained when ethanesulfonylchloride was added dropwise to a solution of alpha-p-chlorophenyl-N-phenylnitrone and triethylamine dissolved in benzene.

EXAMPLES 2–17

Following the general procedures of Example 1, additional compounds of Formula A were prepared by the general reaction

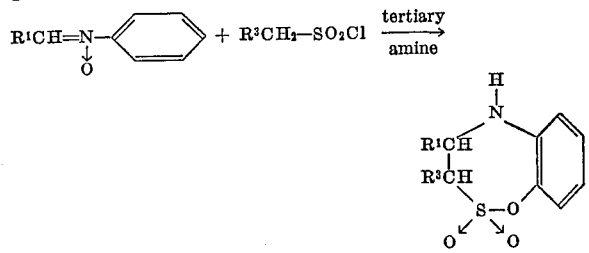

and the results are summarized in the following Table I.

TABLE I

| Ex. | $R^1$ | $R^3$ | Product, M.P., °C. | Product yield, percent |
|---|---|---|---|---|
| 2 | $C_6H_5$ | $C_6H_5$ | 214 | 48 |
| 3 | $C_6H_5$ | H | 168 | 64 |
| 4 | $C_6H_5$ | $CH_3$ | *153, 168 | 60 |
| 5 | $ClC_6H_4$ | H | 187 | 72 |
| 6 | $ClC_6H_4$ | $C_6H_5$ | 218 | 53 |
| 7 | $NO_2C_6H_4$ | H | 224 | 46 |
| 8 | $C_6H_5CO$ | H | 169 | 36 |
| 9 | $C_6H_5$ | Cl | 149 | 43 |
| 10 | $ClC_6H_4$ | Cl | 172 | 32 |
| 11 | $NO_2C_6H_4$ | Cl | 212 | 40 |
| 12 | $ClC_6H_4$ | $CH_3$ | 188 | 37 |
| 13 | $CH_3OC_6H_4$ | $CH_3$ | 187 | 23 |
| 14 | $CH_3OC_6H_4$ | H | 173 | 28 |
| 15 | $CH_3OC_6H_4$ | Cl | 190 | 17 |
| 16 | $ClC_6H_4$ | $Cl(CH_2)_3$ | *132, 164 | 54 |
| 17 | $NO_2C_6H_4$ | $CH_3$ | 247 | 6 |

*Two isomers isolated.

EXAMPLES 18–22

The products of Examples 3, 5, 6, 7 and 12 were treated with bromine or N-bromosuccinimide in carbon tetrachloride to give compounds of this invention having a bromine atom at the 8-position and having the formula

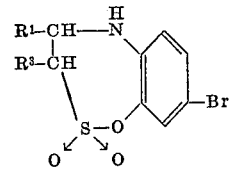

The results are summarized in the following Table II.

TABLE II

| Example | $R^1$ | $R^3$ | Product, M.P., °C. |
|---|---|---|---|
| 18 | $C_6H_5$ | H | 161–162 |
| 19 | $ClC_6H_4$ | H | 159–160 |
| 20 | $ClC_6H_4$ | $C_6H_5$ | 270–271 |
| 21 | $NO_2C_6H_4$ | H | 250–251 |
| 22 | $ClC_6H_4$ | $CH_3$ | 196–197 |

EXAMPLES 23–29

Several compounds of this invention were treated with acylating agents to produce other compounds of this invention having the formula

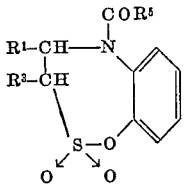

The results are summarized in the following Table III.

TABLE III

| Example | Starting material: Product of example | Acylating agent | R¹ | R³ | R⁵ | Product, M.P., °C. |
|---|---|---|---|---|---|---|
| 23 | 9 | Acetic anhydride | $C_6H_5$ | Cl | $CH_3$ | 210–211 |
| 24 | 12 | ...do... | $ClC_6H_4$ | $CH_3$ | $CH_3$ | 199–201 |
| 25 | 3 | ...do... | $C_6H_5$ | H | $CH_3$ | 159–160 |
| 26 | 5 | ...do... | $ClC_6H_4$ | H | $CH_3$ | 186–187 |
| 27 | 3 | $ClCOCH_2CH_2Cl$ | $C_6H_5$ | H | $CH_2CH_2Cl$ | 153–154 |
| 28 | 5 | $ClCO(OC_2H_5)$ | $ClC_6H_4$ | H | $OC_2H_5$ | 126–127 |
| 29 | 5 | $ClCOCH_2Cl$ | $ClC_6H_4$ | H | $CH_2Cl$ | 148–149 |

EXAMPLE 30

The products of Examples 3 and 5 were treated with nitrous acid dissolved in water to give, respectively, the compounds of this invention having the formulas

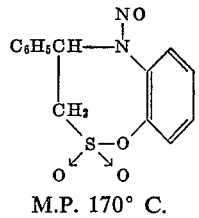

M.P. 170° C.

and

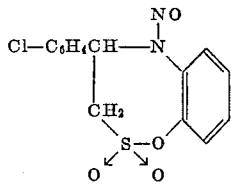

M.P. 183° C.

EXAMPLE 31

The product of Example 16 was reacted with piperidine to give a compound of this invention having the formula

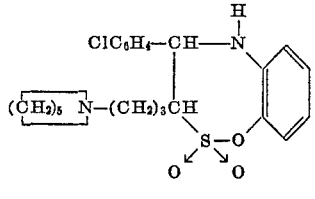

M.P. 161° C.

EXAMPLE 32

The products of Examples 3 and 5 were treated with tetrachlorobenzoquinone in xylene solvent to give, respectively, the compounds of this invention having the formulas

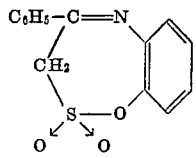

M.P. 162° C.

and

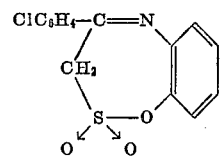

M.P. 219° C.

EXAMPLE 33

The product of Example 9 was treated with triethylamine resulting in dehydrochlorination followed by re-arrangement to give a product identical with the first (M.P. 162° C.) product of Example 32.

What is claimed is:

1. A compound of the formula:

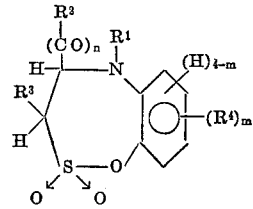

wherein R¹ is selected from the group consisting of hydrogen, acetyl, chloroethylcarbonyl, ethoxycarbonyl, chloroacetyl, and nitroso, wherein n is zero or one, wherein R² represents phenyl, nitrophenyl, chlorophenyl, or alkoxyphenyl wherein the alkoxy has from 1 to 4 carbon atoms;

wherein R³ represents hydrogen, chloro, phenyl, alkyl, alkoxy or chloroalkyl of up to 4 carbon atoms; or amino-substituted alkyl wherein the alkyl has up to 4 carbon atoms;

wherein m represents a number having a value of from zero to four, and wherein R⁴ represents chloro or alkyl of up to 10 carbon atoms.

2. The compound of claim 1 wherein said compound has the formula:

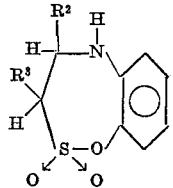

wherein R² and R³ have the meaning stated in claim 1.

3. The process which comprises contacting at least one nitrone of the formula:

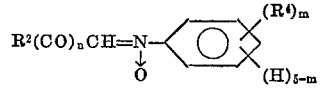

with at least one sulfene of the formula:

$$R^3CH=SO_2$$

for a period of time sufficient to produce a compound of the formula:

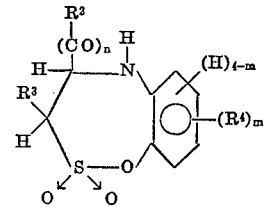

wherein n, m, R², R³ and R⁴ are as defined in claim 1.

4. The process of claim 3 wherein the sulfene is generated in situ by reaction of a tertiary amine with a sulfonyl chloride of the formula:

$$R^3CH_2SO_2Cl$$

wherein R³ is as defined in claim 1.
5. A compound of the formula:
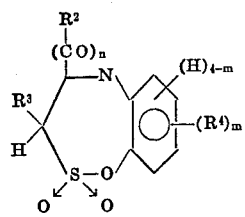
wherein $n$, $m$, R², R³ and R⁴ are as defined in claim 1.
References Cited
Truce et al.: Chem. Ind., (Nov. 6, 1965), pp. 1870–1.
J. A. PATTEN, *Primary Examiner.*
U.S. Cl. X.R.
252—161; 260—247.1, 293.4, 301, 509, 543, 566, 578, 607, 647